US012719262B2

(12) United States Patent
Stanley et al.

(10) Patent No.: US 12,719,262 B2
(45) Date of Patent: Aug. 25, 2026

(54) METHODS AND SYSTEMS FOR CONFIGURING ELECTRONIC FUSES

(71) Applicant: Ford Global Technologies, LLC, Dearborn, MI (US)

(72) Inventors: Robert John Stanley, Billericay (GB); Paul Allen, Wickford (GB); Jonathan Rumford, Woodhurst (GB); Christopher Harrison, Hornchurch (GB); Yucel Aybar, Basildon (GB)

(73) Assignee: Ford Global Technologies, LLC, Dearborn, MI (US)

( * ) Notice: Subject to any disclaimer, the term of this patent is extended or adjusted under 35 U.S.C. 154(b) by 490 days.

(21) Appl. No.: 18/143,925

(22) Filed: May 5, 2023

(65) Prior Publication Data

US 2024/0372355 A1 Nov. 7, 2024

(51) Int. Cl.

| | |
|---|---|
| ***H02H 7/00*** | (2006.01) |
| ***B60L 3/00*** | (2019.01) |
| ***B60L 58/18*** | (2019.01) |
| ***H02H 1/00*** | (2006.01) |
| ***H02H 7/20*** | (2006.01) |

(52) U.S. Cl.

CPC ............. *H02H 7/20* (2013.01); *B60L 3/0023* (2013.01); *B60L 58/18* (2019.02); *H02H 1/0007* (2013.01)

(58) Field of Classification Search

None

See application file for complete search history.

(56) References Cited

U.S. PATENT DOCUMENTS

| | | | |
|---|---|---|---|
| 6,624,499 B2 | 9/2003 | Kothandaraman et al. | |
| 8,559,150 B2 | 10/2013 | Veroni | |
| 10,391,957 B2 * | 8/2019 | Emrani | H02H 3/10 |
| 11,295,017 B2 | 4/2022 | Madrid et al. | |
| 11,349,475 B1 * | 5/2022 | Winger | H03K 17/56 |
| 2003/0146737 A1 * | 8/2003 | Kadouchi | B60L 58/14 320/132 |
| 2021/0229556 A1 * | 7/2021 | Johnson | B60L 58/18 |

FOREIGN PATENT DOCUMENTS

JP 5252374 B2 4/2013

OTHER PUBLICATIONS

Harris, M. "Serial Communications Protocols—CAN and LIN", https://resources.altium.com/p/serial-communications-protocols-can-and-lin, retrieved on May 4, 2023.

* cited by examiner

*Primary Examiner* — Stephen W Jackson
(74) *Attorney, Agent, or Firm* — HG LAW LLP

(57) ABSTRACT

Systems and methods for configuring electronic fuses based on peripheral devices connected to a vehicle system are provided. The methods detect a first peripheral device has been connected to the vehicle system, receive a plurality of signals from the first peripheral device connected to the vehicle system, and configure a first electronic fuse based on the plurality of signals from the first peripheral device. The first electronic fuse is configured to electrically isolate the first peripheral device from the vehicle system upon receiving a current overload.

17 Claims, 10 Drawing Sheets

200
205
212
214
222
223
224
234
250

300
320
314
310
305
312
200

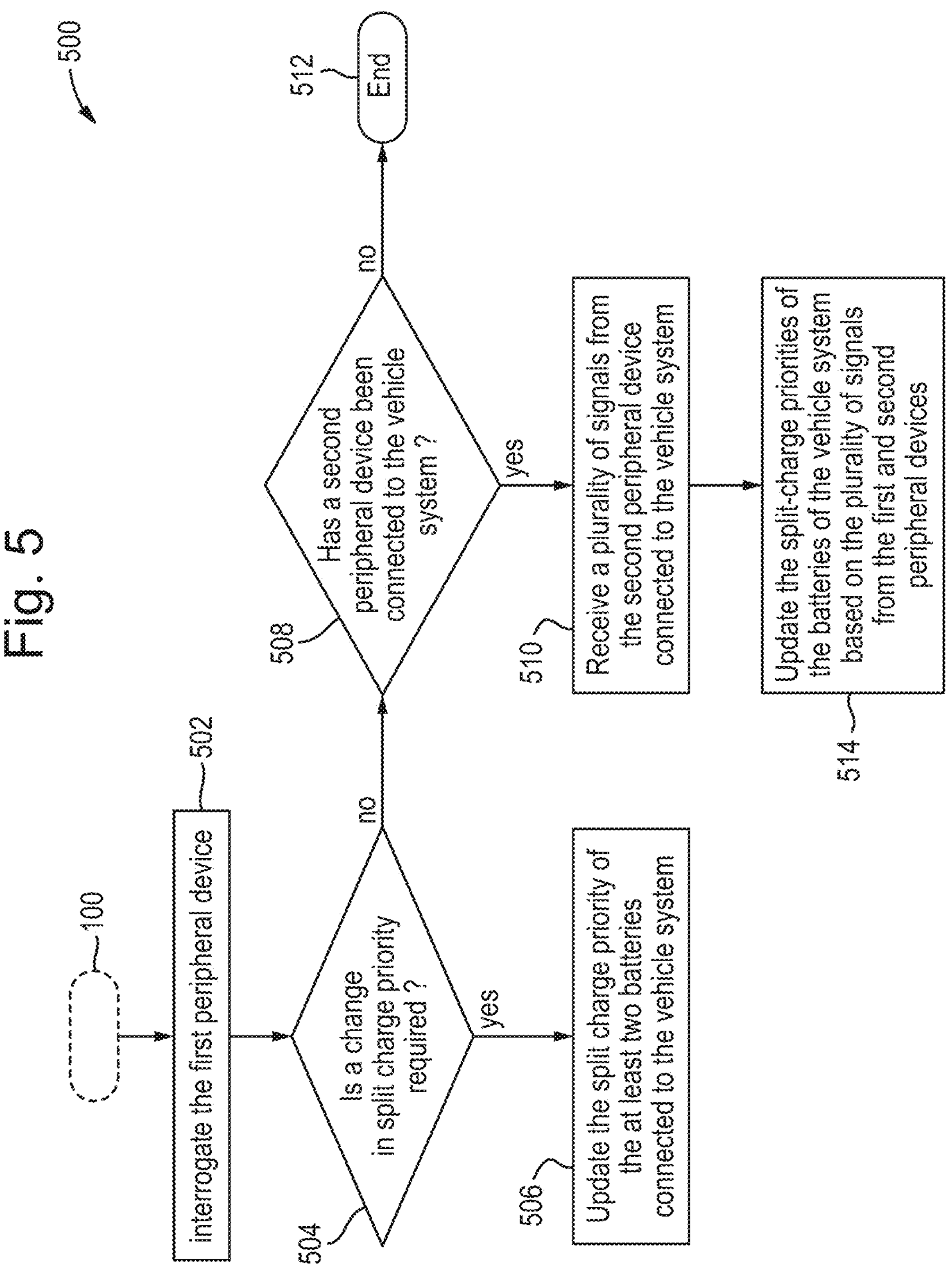
Fig. 5
500
100
interrogate the first peripheral device
502
Is a change in split charge priority required ?
504
yes
no
Update the split charge priority of the at least two batteries connected to the vehicle system
506
Has a second peripheral device been connected to the vehicle system ?
508
no
yes
End
512
Receive a plurality of signals from the second peripheral device connected to the vehicle system
510
Update the split-charge priorities of the batteries of the vehicle system based on the plurality of signals from the first and second peripheral devices
514

800
802
804
806
810
812
820
822
824
830
832
832
832
840
850
870

METHODS AND SYSTEMS FOR CONFIGURING ELECTRONIC FUSES

FIELD

The present disclosure relates to methods and systems for configuring electronic fuses and, more particularly, to systems and related processes for configuring electronic fuses for a vehicle based on the peripheral devices connected to a vehicle system.

BACKGROUND

A leisure battery, also known as a deep cycle battery, is a type of battery used in recreational vehicles (RVs), boats, and other mobile or off-grid applications to provide power for appliances, lights, and other electronics. Unlike starting batteries, which are designed to provide a high burst of energy for a short period of time (such as starting an engine), leisure batteries are designed to provide a consistent and reliable supply of power over an extended period of time.

Leisure batteries are typically lead-acid, lithium-ion, absorbent glass mat (AGM), or gel cell batteries and are chosen based on factors such as capacity, lifespan, maintenance requirements, weight, and expense. In RVs, leisure batteries are typically used to power lights, a refrigerator, a TV, and other appliances when the RV is not connected to shore power.

A smart fuse is a type of fuse that integrates digital technology with traditional fuse elements. It can monitor and control the flow of electrical current and provide information about the current flow and fuse status, making it more intelligent than a traditional fuse. The smart fuse can be programmed with a variety of different features, for example, current limit and fault-time delay, overcurrent, overvoltage, and thermal overload. It also has a wide operating temperature range and is available in a small package, making it suitable for a wide range of applications, including automotive, industrial, and consumer electronics.

SUMMARY

There are proposed herein systems and methods for configuring, e.g., reconfiguring, an electronic fuse, e.g., a smart fuse. A smart fuse can be configured based on the specific needs of the circuit. The digital technology integrated into a smart fuse enables it to be programmed with specific current and voltage thresholds, making it possible to tailor its protection to the specific requirements of a particular circuit. This customization can help enhance the reliability and protection of the circuit by ensuring that the fuse triggers at the right time to prevent overcurrents or the like in the circuit.

By way of summary, there is provided a method for configuring electronic fuses based on peripheral devices connected to a vehicle system, the method comprising: determining, e.g., detecting, that a first peripheral device has been connected to the vehicle system; receiving one or more signals from the first peripheral device connected to the vehicle system, e.g., in response to determining that a first peripheral device has been connected to the vehicle system; and configuring a first electronic fuse, based on the one or more signals from the first peripheral device, to electrically isolate the first peripheral device from the vehicle system upon receiving a current overload.

In some examples, the method further comprises detecting a first current overload; isolating the first peripheral device from the vehicle system; and resetting the first electronic fuse after a first time period.

In some examples, the first time period is user-configurable. In some examples, the first time period is automatically configured based on one or more vehicle system settings and/or an operational parameter of a vehicle.

In some examples, the method may further comprise, after determining that the first peripheral device has been connected to the vehicle system, interrogating the first peripheral device. In some examples, the method further comprises determining a first electronic fuse configuration based on the interrogation of the first peripheral device. In some examples, the method further comprises determining a change in split charge priority of at least two batteries connected to the vehicle system based on the interogation of the first peripheral device; and updating the split charge priority of the at least two batteries connected to the vehicle system.

In some examples, the method further comprises determining that a second peripheral device has been connected to the vehicle system; receiving a plurality of signals from the second peripheral device connected to the vehicle system; and updating the split-charge priorities of the batteries of the vehicle system based on the plurality of signals from the first and second peripheral devices. In some examples, the method further comprises receiving updated split charge priority data, e.g., via an over-the-air update; and updating split charge priority of the at least two batteries based on the updated split charge priority data.

In some examples, the first peripheral device is intterogated over a control circuitry area network, CAN, communication protocol. In some examples, the first peripheral device is intterogated over a local interconnect network, LIN, communication protocol.

In some examples, the method further comprises receiving updated electronic fuse configuration data, e.g., via an over-the-air update; and reconfiguring the first electronic fuse based on the updated configuration data. In some examples, the method further comprises updating the configuration of the first electronic fuse, e.g., via an over-the-air update In another approach, there is provided a non-transitory computer-readable medium, having instructions recorded thereon for for configuring electronic fuses based on peripheral devices connected to a vehicle system, the instructions, when executed, cause a control circuitry to carry out a method, the method comprising: detecting a first peripheral device has been connected to the vehicle system; receiving a plurality of signals from the first peripheral device connected to the vehicle system; and configuring a first electronic fuse based on the plurality of signals from the first peripheral device, wherein the first electronic fuse is configured to electrically isolate the first peripheral device from the vehicle system upon receiving a current overload.

In another approach, there is provided an electronic system for a vehicle, the system comprising control circuitry configured to: determine, e.g., detect, that a first peripheral device has been connected to the vehicle system; and input/output circuitry configured to: receive one or more signals from the first peripheral device connected to the vehicle system, and wherein the control circuitry is further configured to: configure a first electronic fuse, based on the one or more signals from the first peripheral device, to electrically isolate the first peripheral device from the vehicle system upon receiving a current overload.

In another approach, there is provided a vehicle comprising an electronic system for a vehicle, the system comprising a control circuitry configured to: detect a first peripheral device has been connected to the vehicle system; and input/output circuitry configured to: receive a plurality of signals from the first peripheral device connected to the vehicle system, and wherein the control circuitry is further configured to: configure a first electronic fuse based on the plurality of signals from the first peripheral device, wherein the first electronic fuse is configured to electrically isolate the first peripheral device from the vehicle system upon receiving a current overload.

BRIEF DESCRIPTION OF THE DRAWINGS

The above and other objects and advantages of the disclosure will be apparent upon consideration of the following detailed description, taken in conjunction with the accompanying drawings, in which:

FIG. 5 is an illustrative flowchart of a process for updating split charge priorities, in accordance with some examples of the present disclosure;

DETAILED DESCRIPTION

Figure 1:
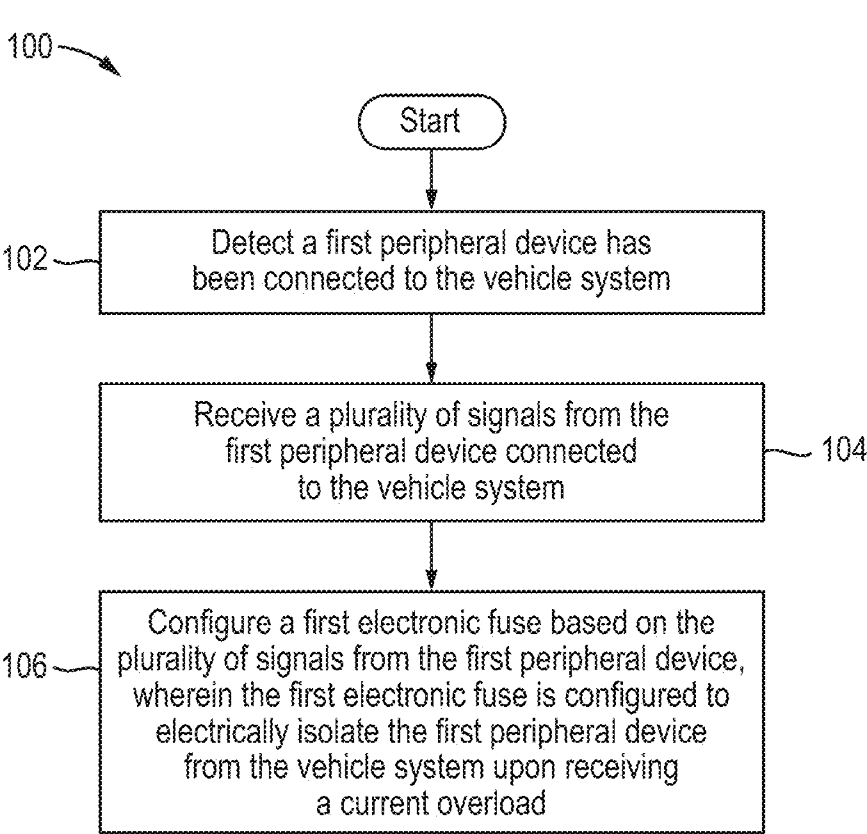
FIG. 1 is an illustrative flowchart of a process for configuring electronic fuses based on peripheral devices connected to a vehicle system, in accordance with some examples of the present disclosure.

As briefly described above, recreational vehicles (RVs) are vehicles that have leisure batteries, as they are designed for recreational use, such as camping, travel, and other leisure activities. However, a plurality of other types of vehicles and craft also use leisure batteries such as boats, caravans, motorhomes, camping trailers, and other types of mobile or off-grid applications. These batteries provide power for appliances, lights, and other electronics in these vehicles when they are not connected to shore or grid power.

In addition to vehicles, leisure batteries can also be found in off-grid homes, cabins, and other applications that require a reliable source of power. In these applications, leisure batteries can be combined with solar panels or other alternative power sources to provide a complete and self-sustaining power system.

Split charge priority refers to the management of the charging process for multiple batteries in a vehicle, such as an onboard leisure battery. A split charge system is used to prioritize which battery should receive the charge from the vehicle's alternator when the engine is running. For example, in a vehicle with both a main starting battery and a separate leisure battery, the split charge priority system would ensure that the main starting battery is charged first, ensuring that it has enough power to start the engine. Once the main battery is fully charged, any remaining charge is directed to the leisure battery to keep it charged and ready for use. A circuit using smart fuses and interrogation technology can be used to determine split charge priority onboard a vehicle. By integrating smart fuses into the vehicle's electrical system, the flow of current can be monitored and controlled in real-time, providing information about the status of the batteries and the charging process.

Accordingly, a vehicle or the like can utilize configurable and programmable smart fuses in several ways: i) circuit protection-smart fuses can be programmed to provide protection for specific circuits in the vehicle, such as the electrical system, lights, or audio system; ii) real-time monitoring—by connecting smart fuses to a computer or other control system, real-time data can be collected and monitored to identify potential issues and enhance performance; iii) improved diagnostics—smart fuses can provide information about the flow of current and fuse status, making it easier to diagnose and fix issues in the vehicle's electrical system; iv) customization-smart fuses can be configured to meet the specific requirements of the vehicle, allowing for a tailored and optimized electrical system. Overall, the use of smart fuses in vehicles can lead to increased efficiency, and performance, making it an attractive solution for vehicle manufacturers and consumers alike.

A smart fuse can be combined with technology that interrogates the devices plugged into a circuit by integrating digital communication protocols into the smart fuse. This allows the smart fuse to communicate with the devices plugged into the circuit and exchange information about their status, current draw, and other relevant data. The combination of the smart fuse and the device interrogation technology can provide a complete and integrated solution for monitoring and controlling the flow of current in a circuit.

For example, the smart fuse could communicate with a device plugged into the circuit using a standard protocol, such as I2C, SPI, LIN, or CAN, to gather information about the device and its current draw. If the device is drawing an excessive amount of current, the smart fuse can respond by limiting the flow of current, triggering an alarm, or shutting down the circuit entirely to protect it from extreme conditions.

This combination of technologies provides a highly flexible and efficient solution for monitoring and controlling the flow of current in a circuit, enabling real-time monitoring, diagnostics, and protection.

FIG. 1 is an illustrative flowchart of a process for configuring electronic fuses based on peripheral devices connected to a vehicle system, in accordance with some examples of the present disclosure. Process 100 starts at step 102. At step 102, a first peripheral device is detected as it is connected to the vehicle system. For example, control circuitry (e.g., circuitry 1110 of FIG. 11) of a computing device (e.g., onboard computer of a vehicle, computing module 1102) may detect a first peripheral device is connected to the vehicle system.

At step 104, a plurality of signals are received from the first peripheral device connected to the vehicle system. For example, input/output circuitry (e.g., circuitry 1120 of FIG. 11) of the computing device may receive a plurality of signals from the first peripheral device connected to the vehicle system. Examples of the types of signals that are received comprise vehicle speed input (e.g., as a pulse-width modulation input), ignition signal, electric power-assisted steering system data, relay open requests, engine run input, RPM speed control circuitry, power isolation signals, peripheral device operational data, the peripheral device operational data comprising operating current, operating power, operating timing data, and the like.

At step 106, a first electronic fuse is configured based on the plurality of signals from the first peripheral device, wherein the first electronic fuse is configured to electrically isolate the first peripheral device from the vehicle system upon receiving a current overload. For example, the control circuitry of the computing device may configure a first electronic fuse, based on the plurality of signals from the first peripheral device, to electrically isolate the first peripheral device from the vehicle system upon receiving a current overload.

In various examples, the individual steps of processes 100, 400, 500, 600, and 700 may be implemented by one or more components of the devices and systems of FIGS. 8, 9, 10 and 11. Although the present disclosure may describe certain steps of the processes as being implemented by certain components of the devices and systems of FIGS. 8, 9, 10 and 11 this is for purposes of illustration only, and it should be understood that other components of the devices and systems of FIGS. 8, 9, 10 and 11 may implement those steps instead.

A smart fuse can be configured based on the specific needs of the peripheral device connected to the circuit of the vehicle. The digital technology integrated into a smart fuse enables it to be programmed with specific current and voltage thresholds, making it possible to tailor its operational for overcurrent detection to the specific requirements of a particular circuit. This customization can help better the reliability and protection of the circuit by ensuring that the fuse triggers at the right time to prevent issues to the vehicle system or the peripheral device itself.

Figure 2A:
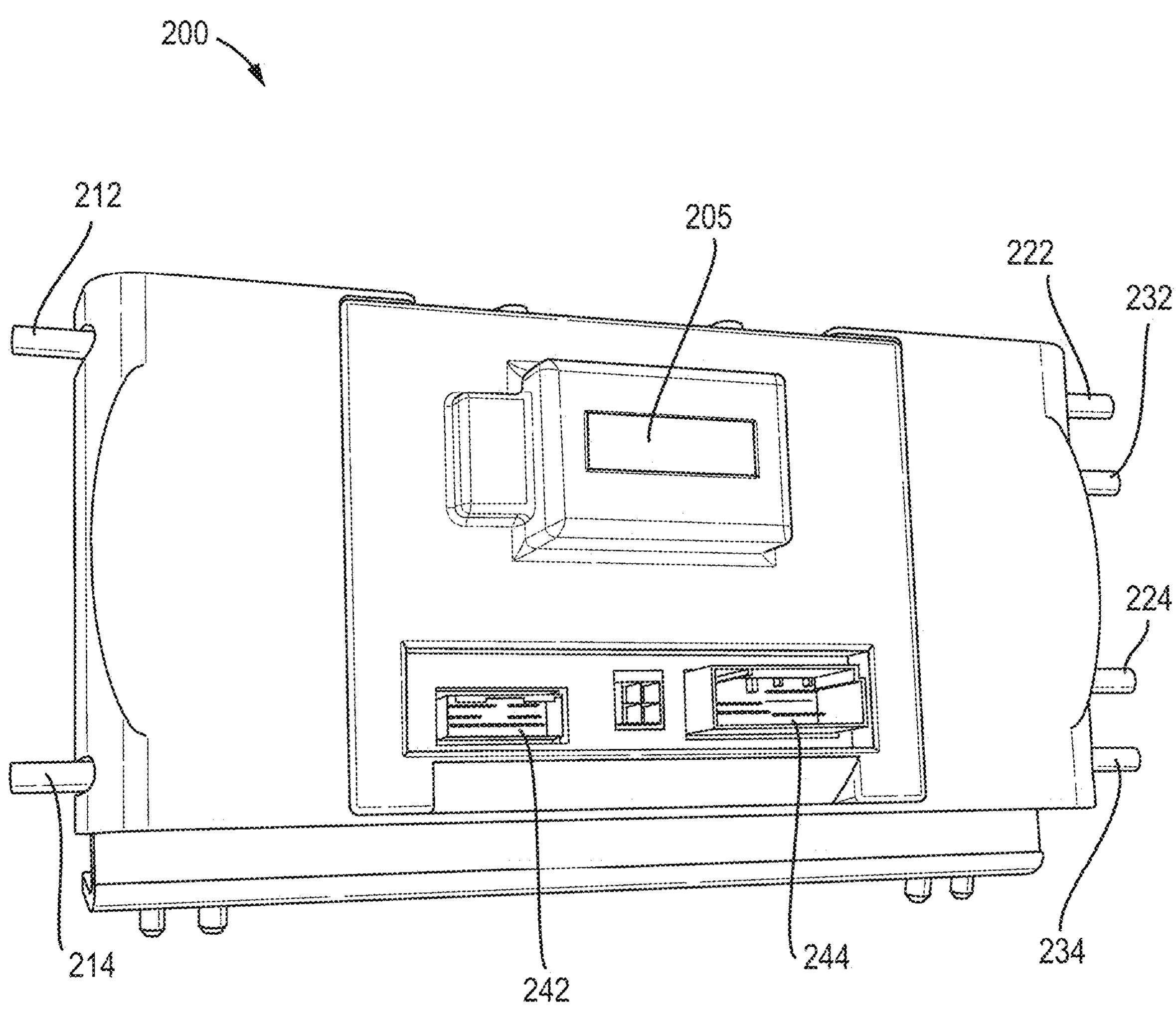
FIGS. 2A and 2B illustrate a smart fuse box, in accordance with some examples of the present disclosure.
Figure 2B:
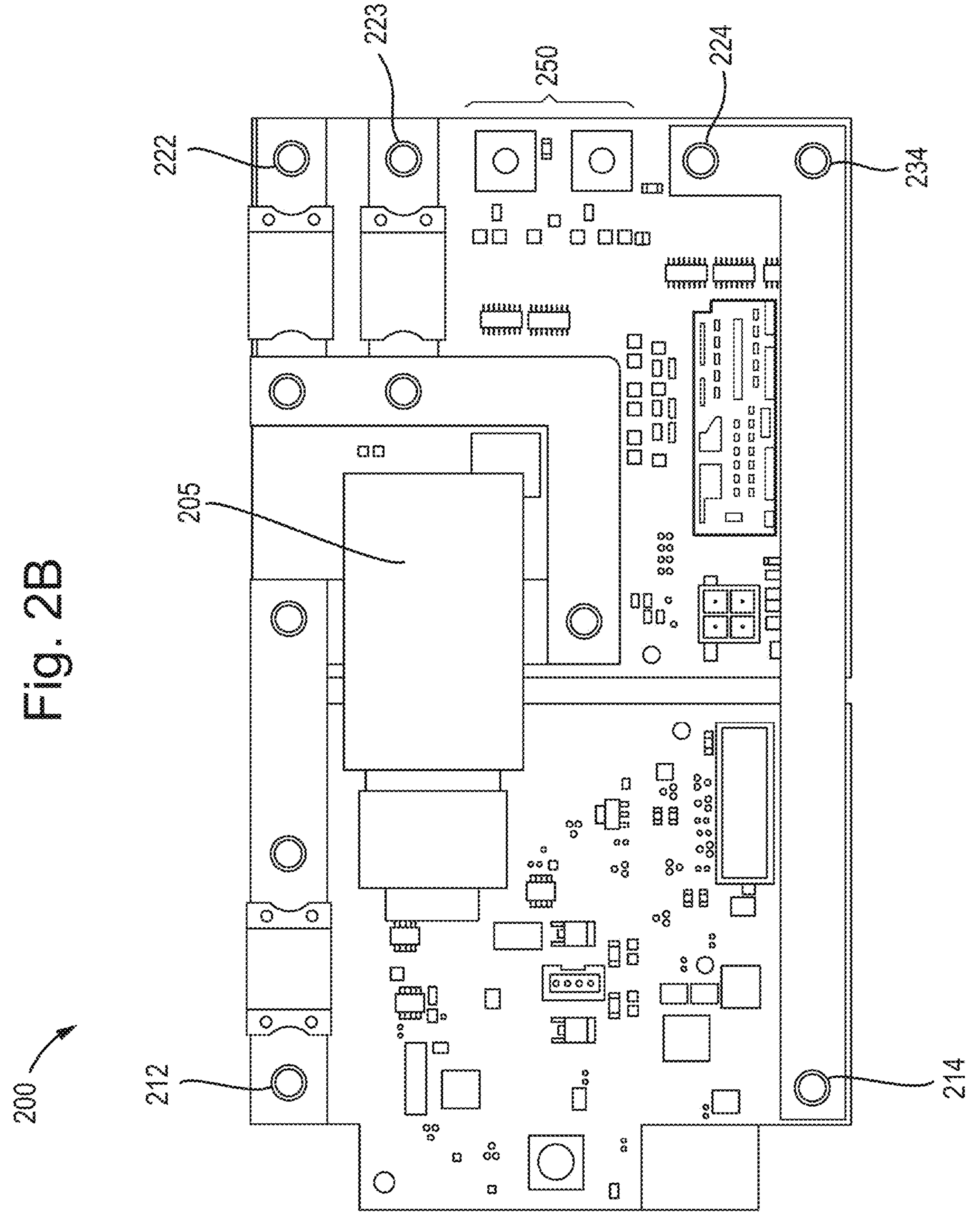

FIGS. 2A and 2B illustrate a smart fuse box 200, in accordance with some examples of the present disclosure. The smart fuse box 200 comprises an ERS battery guard 205, first positive power terminal 212, first negative power terminal 214, second positive power terminal 222, second negative power terminal 224, optionally a third positive power terminal 232, optionally a third negative power terminal 234, vehicle communication ports 242-244, and digitally fused outlets 250.

ERS battery guard refers to a type of electronic system or device designed to protect and manage the battery in a vehicle, typically in the context of electric and hybrid vehicles. The purpose of an ERS battery guard is to monitor the state of the battery and provide protection against overcharging, over-discharging, and the like. An ERS battery guard typically includes features such as current and voltage sensing, temperature monitoring, and charge and discharge control. By monitoring the battery state and controlling the charging and discharging process, the ERS battery guard helps to extend the life of the battery and increase the overall performance and reliability of the vehicle. In the context of electric and hybrid vehicles, the ERS battery guard plays an important role in ensuring the protection and reliability of the vehicle, and it is a critical component of the overall energy management system.

Vehicle communication ports 242-244, are configured to communicate with devices and peripherals in a vehicle. For example, vehicle communication ports may communicate over local interconnect network (LIN) and control circuitry area network (CAN) communication protocols; these are frequently used in automotive and industrial applications, and they can be used to communicate with smart fuses to exchange information about the flow of current and the status of the fuse.

By integrating LIN or CAN communication protocols into a smart fuse, the fuse can be connected to a control system or other device, allowing real-time monitoring, control, and diagnostics of the circuit. The combination of a smart fuse and LIN or CAN communication protocols can provide a complete and highly flexible solution for monitoring and controlling the flow of current in a circuit.

In more detail, CAN is a broadcast-based communication protocol that is used for interconnecting control systems and other devices in vehicles. It allows multiple devices to communicate with each other and with a central control unit, making it possible to share information and coordinate actions in real-time. LIN is a low-cost, single-wire communication protocol that is used in automotive and industrial applications to connect simple devices and sensors. LIN is often used to complement CAN networks, and it provides a low-speed and low-complexity communication solution for small amounts of data. Both LIN and CAN protocols are designed to be robust and reliable, even in harsh environments. They play an important role in enabling efficient and effective communication between devices in various systems and applications.

It is possible to interrogate devices in a vehicle using CAN and LIN protocols. Both protocols allow for the communication of data between devices, and the information can be used to determine the operating properties of the devices. For example, a device could report its current status, such as its temperature or voltage, to a central control circuitry over a CAN or LIN network. The central control circuitry could then use this information to monitor the performance of the device and make decisions about how to control it. By interrogating devices in this way, it is possible to obtain a comprehensive view of the operating properties of a vehicle and its systems, which can help to optimize performance and diagnose issues. This is a valuable tool for vehicle designers, manufacturers, and maintenance engineers, who can use the data to increase the functionality and reliability of the vehicle.

Smart fuses can be controlled by software. They often have digital interfaces, such as USB or Ethernet, that allow them to be connected to a computer or other control system. This allows the fuses to be monitored and controlled through software, enabling real-time status monitoring and adjusting of current and voltage thresholds. By incorporating software control, smart fuses offer greater flexibility and accuracy compared to traditional fuses, allowing for more efficient and effective protection of the circuit.

An example of a smart fuse device integrates a high-side metal-oxide semiconductor field-effect transistor (MOSFET) switch with a precise current sense comparator, and is configurable (e.g., through I2C or SPI interfaces). The smart fuse can be programmed with a current limit and fault-time delay, and it has built-in protection against overcurrent, overvoltage, and thermal overload. It also has a wide operating temperature range and is available in a small package, making it suitable for a wide range of applications, including automotive, industrial, and consumer electronics.

FIG. 2B shows the inside of the smart fuse box 200. In some examples, the smart fuse box 200 combines the current vehicle fuse box and battery guard 205 features into a single unit. Battery Guard provides up to 250 A fully fused power. The digitally fused outlets may comprise a plurality of single fuses rated from 10 A to 40 A, however, other current ratings are considered within the scope of this disclosure. The smart fuse box 200 comprises split charge capability for a second leisure battery through a second positive power terminal 222 and a second negative power terminal 224. In addition, an optional third leisure battery may be electrically connected to the smart fuse box 200 through a third positive power terminal 232 and third negative power terminal 234.

Figure 3:
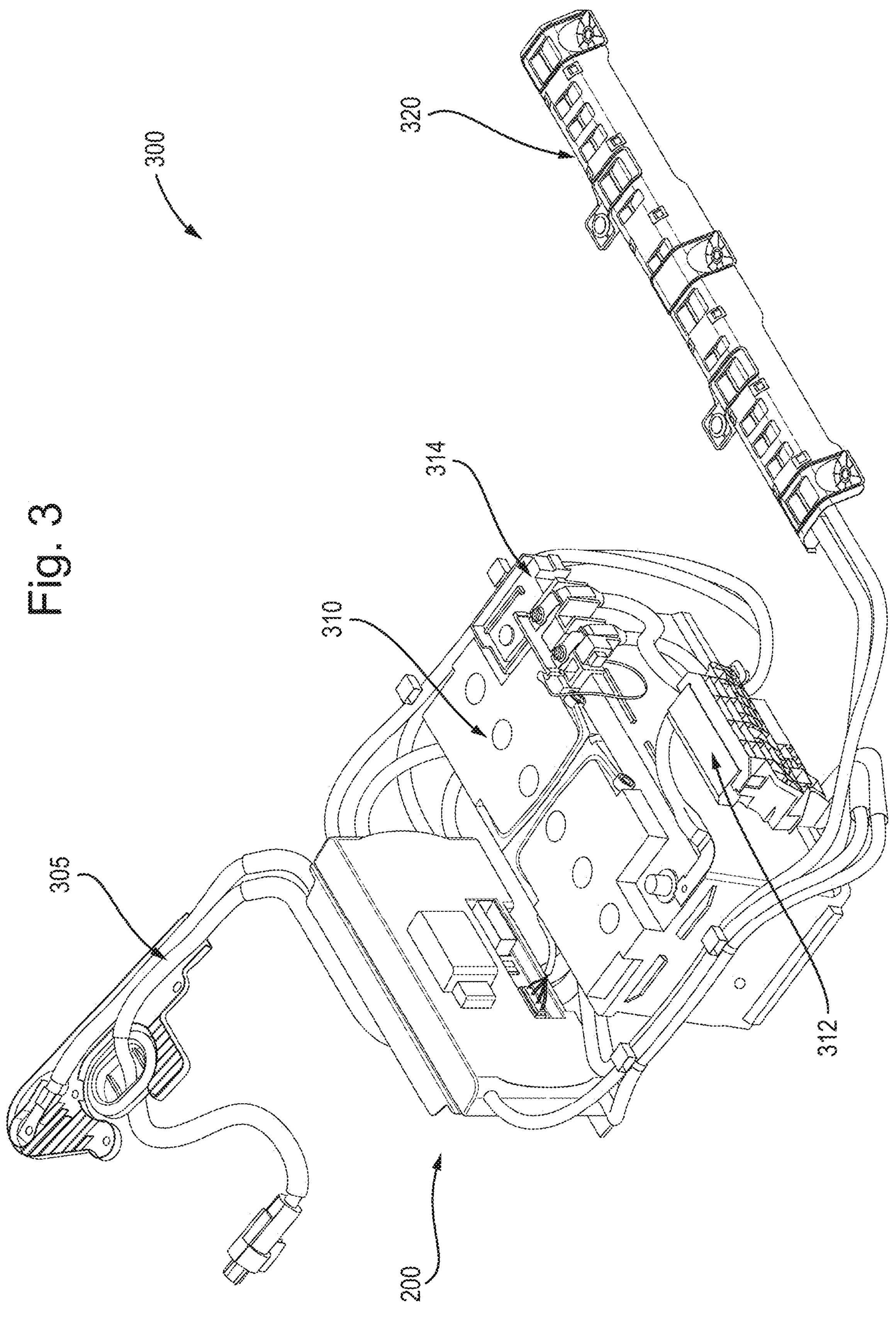
FIG. 3 illustrates a smart fuse box and leisure battery system, in accordance with some other examples of the present disclosure.

FIG. 3 illustrates a smart fuse box and leisure battery system, in accordance with some other examples of the present disclosure. Primary battery cables 305 electrically connect the engine bay of the vehicle to the smart fuse box 200, such as smart fuse box 200 of FIGS. 2A and 2B. The smart fuse box 200 is electrically connected to a first leisure battery 310, as shown in FIG. 3, and an optionally second leisure battery 320. The first leisure battery 310 may comprise a customer connection point 312 and a mini local fuse box 314.

Figure 4:
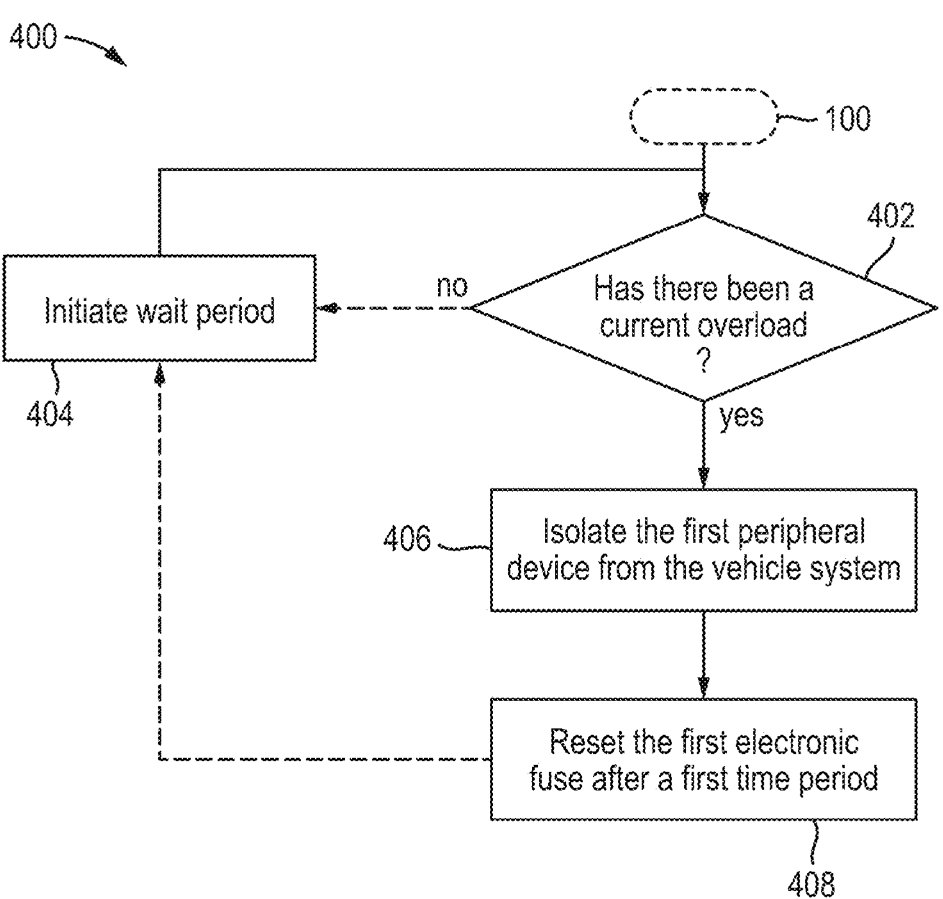
FIG. 4 is an illustrative flowchart of a process for resetting an electronic fuse, in accordance with some examples of the present disclosure.

FIG. 4 is an illustrative flowchart of a process for resetting an electronic fuse, in accordance with some examples of the present disclosure. Process 400 begins at step 402, which may follow process 100, or be carried out in parallel to process 400. In some examples, the steps of process 400 (e.g., steps 402-408) are implemented by control circuitry (e.g., circuitry 1110 of FIG. 11) of a computing device (e.g., onboard computer of a vehicle, computing module 1102).

At step 402, it is determined if there has been a current overload. If the answer to step 402 is no, process 400 continues on to step 404. If the answer to step 402 is yes, process 400 continues on to step 400. At step 404, a wait period is initiated before process 400 returns to step 402.

At step 406, the first peripheral device is isolated from the vehicle system. At step 408, the first electronic fuse is reset after a first time period.

In various examples, the individual steps of processes 100, 400, 500, 600, and 700 may be implemented by one or more components of the devices and systems of FIGS. 8, 9, 10 and 11. Although the present disclosure may describe certain steps of the processes as being implemented by certain components of the devices and systems of FIGS. 8, 9, 10 and 11 this is for purposes of illustration only, and it should be understood that other components of the devices and systems of FIGS. 8, 9, 10 and 11 may implement those steps instead.

FIG. 5 is an illustrative flowchart of a process for updating split charge priorities, in accordance with some examples of the present disclosure. Process 500 begins at step 502, which may follow process 100, or be carried out in parallel to process 500. In some examples, the steps of process 500 (e.g., steps 502-514) are implemented by control circuitry (e.g., circuitry 1110 of FIG. 11) of a computing device (e.g., onboard computer of a vehicle, computing module 1102).

At step 502, the first peripheral device is interrogated. To "interrogate" a device in this context means to gather information from it. This can be done by sending commands or requests to the device over a communication network, such as CAN or LIN, and receiving data in response. The data obtained from the device can provide information about its operating properties, such as its status, performance, and configuration.

Interrogating devices can be useful in various applications, as it allows for the monitoring and analysis of device performance, and can also help to diagnose issues and increase system efficiency. Interrogating devices over communication protocols, such as CAN or LIN, is a common method for obtaining information from devices in automotive and industrial applications. The data obtained from these protocols can be used to make decisions about how to control the devices and better system performance.

At step 504, it is determined whether or not there a change in split charge priority is required. Split charge priority refers to the management of the charging process for multiple batteries in a vehicle, such as an onboard leisure battery. A split charge system is used to prioritize which battery should receive the charge from the vehicle's alternator when the engine is running. For example, in a vehicle with both a main starting battery and a separate leisure battery, the split charge priority system would ensure that the main starting battery is charged first, ensuring that it has enough power to start the engine. Once the main battery is fully charged, any remaining charge is directed to the leisure battery to keep it charged and ready for use. A circuit using smart fuses and interrogation technology can be used to determine split charge priority onboard a vehicle. By integrating smart fuses into the vehicle's electrical system, the flow of current can be monitored and controlled in real-time, providing information about the status of the batteries and the charging process.

If the answer to step 504 is yes, process 500 continues on to step 506. If the answer to step 508 is no, process 500 continues on to step 508. Interrogation technology through communication protocols can be used to monitor the state of the batteries and provide information about their voltage, current draw, and other relevant data. This information can be used by the control system to determine the split charge priority, directing the flow of current to the battery that requires charging first. For example, if the main starting battery is at a low voltage, the control system can direct the flow of current to it, ensuring that it is properly charged and ready for use. Once the main battery is fully charged, the remaining charge can be directed to the leisure battery. At step 506, the split charge priority of the at least two batteries connected to the vehicle system is updated.

By using a combination of smart fuses and interrogation techniques, the split charge priority onboard a vehicle can be determined accurately and efficiently, improving the overall performance and reliability of the electrical system. The priority of the charging process can be configured based on the specific needs of the vehicle, with the ability to give priority to either the main starting battery, the leisure battery, or a combination of both. The split charge priority system helps to ensure that the batteries are properly charged and ready for use, improving the overall reliability and performance of the electrical system in the vehicle.

At step 508, it is determined if a second peripheral device has been connected to the vehicle system. If the answer to step 508 is no, process 500 continues on to step 512 and ends. If the answer to step 508 is yes, process 500 continues on to step 510.

At step 510, a plurality of signals from the second peripheral device connected to the vehicle system is received. The system combining smart fuses, interrogation technology over CAN and LIN protocols, and determining split charge priority is advantageous for a wide range of vehicles, which are described in more detail with reference to FIG. 11 below, including; recreational vehicles, electric vehicles (EVs) and hybrid vehicles (HEVs), marine vehicles, off-grid vehicles. In summary, a split charge priority system is advantageous for a wide range of vehicles that have multiple batteries and require efficient and optimal charging.

At step 514, the split-charge priorities of the batteries of the vehicle system are updated based on the plurality of signals from the first and second peripheral devices. A vehicle, using smart fuses, interrogation technology (e.g., CAN and LIN protocols), and determining split charge priorities can be made more granular by:

Dynamic Battery Management: The control system can be configured to dynamically manage the split charge priority based on real-time data from the batteries, such as voltage, current draw, and temperature. This allows for the split charge priority to be adjusted on-the-fly, ensuring that the batteries are charged optimally and efficiently;

Advanced Diagnostics: The interrogation technology can be used to provide advanced diagnostics information about the batteries and the electrical system, including battery health, current flow, and temperature. This information can be used to enhance the accuracy and granularity of the split charge priority, ensuring that the batteries are charged and maintained properly;

Multiple Charging Modes: The system can be configured to support multiple charging modes, such as normal charging, maintenance charging, and fast charging. The split charge priority can be adjusted based on the specific needs of the vehicle and the type of charging mode being used; and/or User-Defined Settings: The split charge priority can be customized by the user, allowing for the flow of current to be directed to the batteries based on their specific needs and preferences. For example, a user may choose to give priority to the main starting battery in order to ensure that it is always fully charged and ready for use. These user-defined settings can be easily updated and changed as needed.

In various examples, the individual steps of processes 100, 400, 500, 600, and 700 may be implemented by one or more components of the devices and systems of FIGS. 8, 9, 10 and 11. Although the present disclosure may describe certain steps of the processes as being implemented by certain components of the devices and systems of FIGS. 8, 9, 10 and 11 this is for purposes of illustration only, and it should be understood that other components of the devices and systems of FIGS. 8, 9, 10 and 11 may implement those steps instead.

Figure 6:
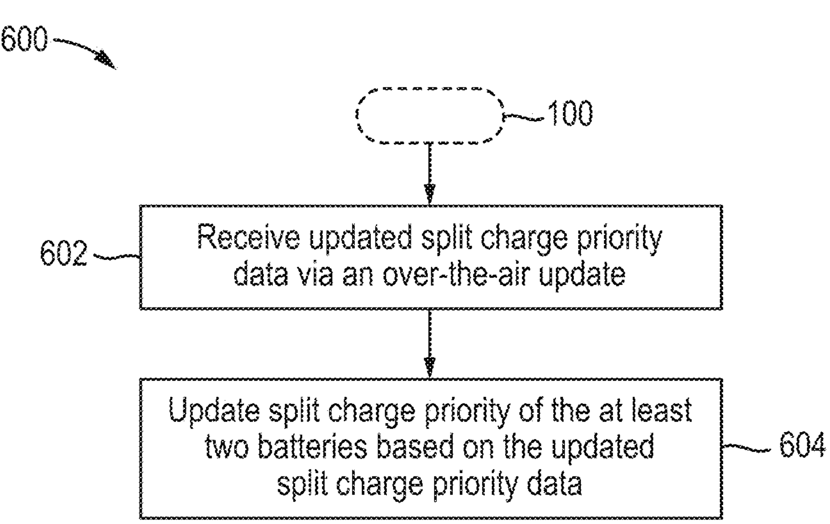
FIG. 6 is an illustrative flowchart of a process for updating a split charge priority, in accordance with some examples of the present disclosure.

FIG. 6 is an illustrative flowchart of a process for updating a split charge priority via an over-the-air update, in accordance with some examples of the present disclosure. Process 600 begins at step 602. In some examples, the steps of process 600 (e.g., steps 602-604) are implemented by control circuitry (e.g., circuitry 1110 of FIG. 11) of a computing device (e.g., onboard computer of a vehicle, computing module 1102).

At step 602, updated split charge priority data is received via an over-the-air update. It is possible for the control modalities of smart fuses, interrogation technology, and split charging to be updated with over-the-air (OTA) updates. OTA updates allow software updates to be transmitted wirelessly to the system, eliminating the need for manual updates and reducing the time and effort required to maintain the system.

For example, OTA updates can be used to update the firmware of the smart fuses and interrogation technology, providing new features and bug fixes as needed. The split charge priority algorithm can also be updated, allowing for changes to be made to the charging process based on the needs of the vehicle.

At step 604, the split charge priority of the at least two batteries is updated based on the received updated split charge priority data. OTA updates provide a convenient and flexible solution for maintaining the control modalities of smart fuses, interrogation technology, and split charging, allowing for updates to be made quickly and easily without the need for manual intervention. This helps to better the performance and reliability of the system, and can be especially useful in vehicle applications where timely updates are critical for protection and performance.

In various examples, the individual steps of processes 100, 400, 500, 600, and 700 may be implemented by one or more components of the devices and systems of FIGS. 8, 9, 10 and 11. Although the present disclosure may describe certain steps of the processes as being implemented by certain components of the devices and systems of FIGS. 8, 9, 10 and 11 this is for purposes of illustration only, and it should be understood that other components of the devices and systems of FIGS. 8, 9, 10 and 11 may implement those steps instead.

Figure 7:
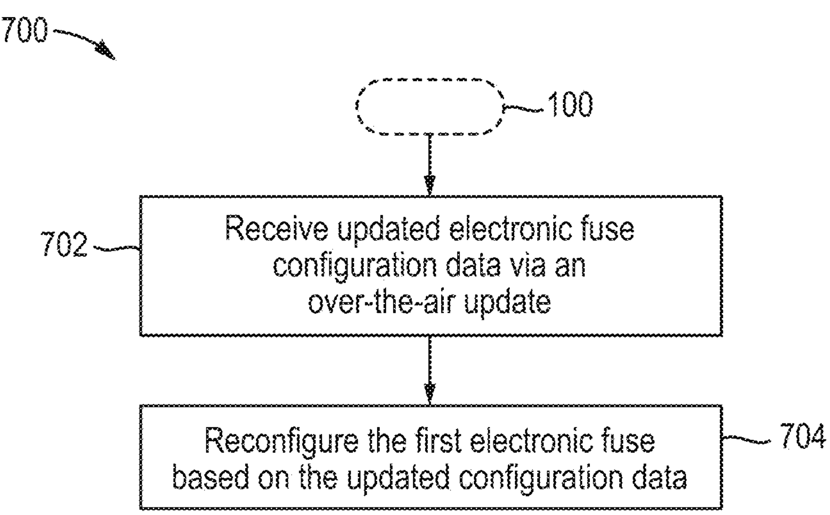
FIG. 7 is an illustrative flowchart of a process for updating a an electronic fuse configuration, in accordance with some examples of the present disclosure.

FIG. 7 is an illustrative flowchart of a process for updating an electronic fuse configuration via an over-the-air update, in accordance with some examples of the present disclosure. Process 700 begins at step 702. In some examples, the steps of process 700 (e.g., steps 702-704) are implemented by control circuitry (e.g., circuitry 1110 of FIG. 11) of a computing device (e.g., onboard computer of a vehicle, computing module 1102).

At step 702, updated electronic fuse configuration data is received via an over-the-air update. It can be advantageous to be able to update the configuration of smart fuses because it allows for greater flexibility and adaptability of the system. By being able to update the configuration, the system can be customized to meet the changing needs and requirements of the vehicle, its application, or user behaviour. In addition, over-the-air updates can make it easier to implement new features and advancements, as well as resolve bugs and issues, without requiring physical access to the vehicle. This can save time, reduce expenses, and increase the overall user experience.

At step 704, the first electronic fuse is reconfigured based on the updated configuration data. For example, the system may need to be updated to handle new devices or electrical loads, or to accommodate changes in the vehicle's operating conditions. Updating the configuration of smart fuses allows the system to adapt and handle these changes, which can enhance its overall performance and reliability. By being able to update and reconfigure the configuration of smart fuses, the system can be kept up-to-date and optimized to meet the evolving needs of the vehicle or application, which can help to ensure its ongoing reliability and performance.

In various examples, the individual steps of processes 100, 400, 500, 600, and 700 may be implemented by one or more components of the devices and systems of FIGS. 8, 9, 10 and 11. Although the present disclosure may describe certain steps of the processes as being implemented by certain components of the devices and systems of FIGS. 8, 9, 10 and 11 this is for purposes of illustration only, and it should be understood that other components of the devices and systems of FIGS. 8, 9, 10 and 11 may implement those steps instead.

Figure 8:
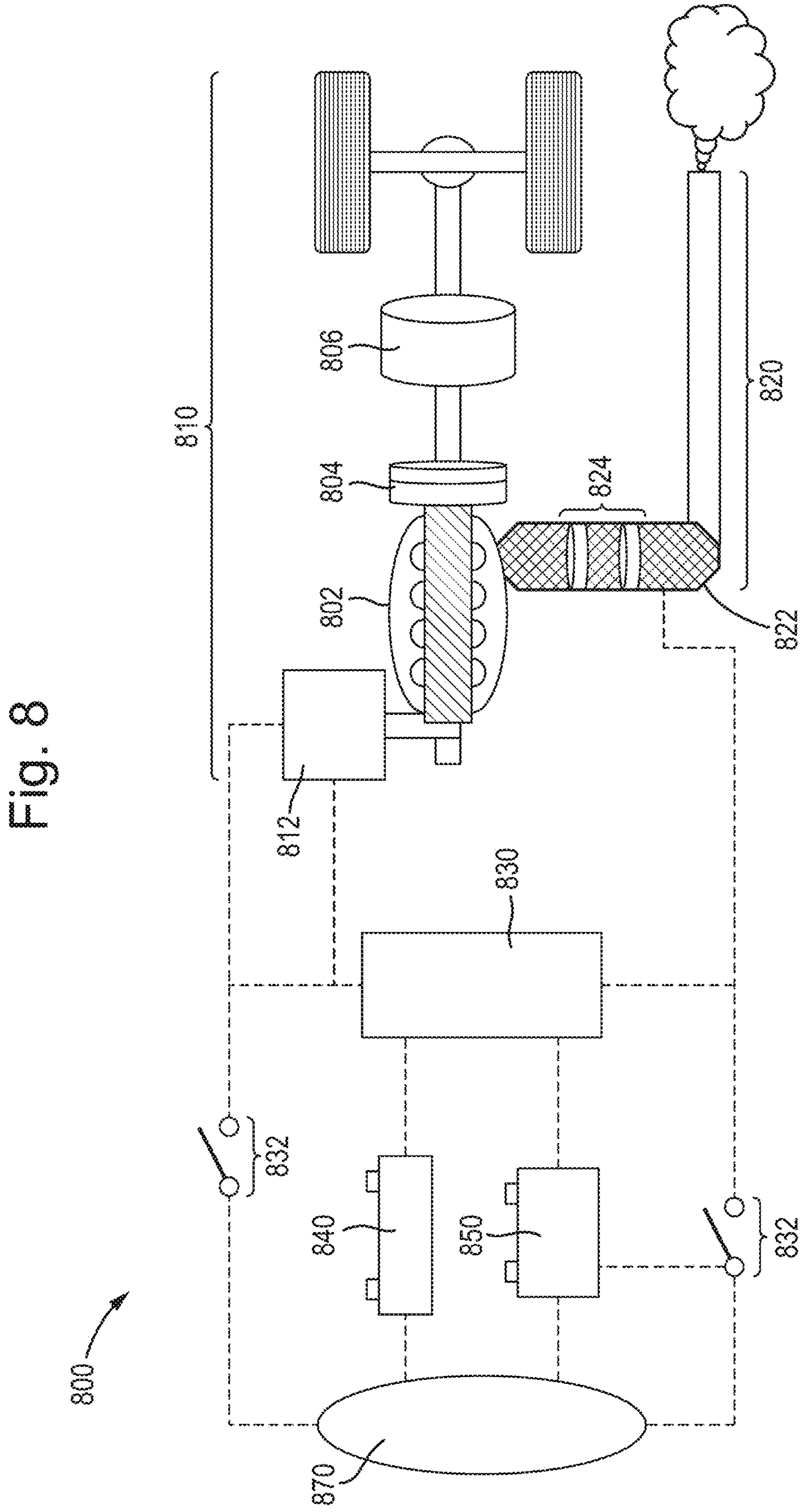
FIG. 8 is a block diagram of a control system for a hybrid electric vehicle, in accordance with some examples of the present disclosure.

FIG. 8 is a block diagram of a control system for a hybrid electric vehicle (HEV), in accordance with some embodiments of the present disclosure. In the example shown in FIG. 8, the power control system 800 is for an exemplary HEV system architecture, in accordance with at least one of the examples described herein. Each of the systems shown in FIG. 8 are communicatively and/or electrically coupled via control circuitry 830 (illustrated by the dashed line connectors). Shown in FIG. 8 is a belt-integrated starter-generator (BISG) 812, which is a device that may apply positive torque and assist the engine in reducing the amount of work it has to do, or, in some examples, apply negative torque to generate electrical energy. The BISG 812 may be referred to as a motor generator. The BISG 812 is integrated into the drive train 810, along with engine 802, clutch 804, and transmission 808. In some examples, the BISG 812 transmits torque to the engine's crankshaft when it's operating as a hybrid drive motor, and the crankshaft transmits torque back to the BISG 812 when it operates as a generator, converting kinetic energy from the moving vehicle back into electricity, operating as a conventional alternator.

In some examples, engine 802 has an exhaust system 820 comprising an aftertreatment system 822, which comprises a plurality of electronic exhaust gas heaters (eEGH) 824. The aftertreatment system 822 may further comprise a diesel particulate filter (DPF) or gasoline particulate filter (GPF), which are filters that capture and store exhaust soot, coke, and/or char, collectively referred to as particulate matter. Particulate filters are other forms of after-treatment utilized to reduce emissions from internal combustion engine (ICE) vehicles. particulate filters have a finite capacity, the trapped particulate matter periodically has to be emptied or 'burned off' to regenerate the particulate filter, which an eEGH may also be used to assist with. This regeneration process cleanly burns off the excess particular matter deposited in the filter, reducing the detrimental exhaust emission. In some examples, the regeneration process may be initiated in response to predicting that there will be a braking event. For example, if the amount of particulate matter within the after-treatment system is determined to be above a threshold and a regeneration process is required, the after-treatment system can wait until a prediction of low demand from the interrogated vehicle devices and then the eEGH can be activated to regenerate the after-treatment filters while extra energy is available.

Moreover, in some examples, there is also provided a selective catalytic reduction (SCR) system (not shown). An SCR is another emissions control technology system that injects a liquid-reductant agent through a special catalyst into the exhaust stream of engines, in particular diesel engines. The reductant source is usually automotive-grade urea, otherwise known as diesel exhaust fluid (DEF). The DEF sets off a chemical reaction that converts nitrogen oxides into nitrogen, water, and low amounts of carbon dioxide (CO2), which is then expelled through the vehicle tailpipe. The exhaust system 820 may further comprise several sensors to detect the flue gas containing oxides of nitrogen (NOx) and oxides of sulphur (SOx), to ensure the final emissions are within a guideline amount.

In some examples, the exhaust system comprises an exhaust gas recovery system, which is enabled by an EGR switch (not shown). The EGR switch enables some or all exhaust gas, or the thermal energy of the exhaust gas, to be recirculated through the exhaust system to further compound the heating effect of the eEGH 824. The eEGH 824 typically comprises a heating element disposed within, or near, a catalyst. eEGHs are required in various use cases and will demand a power supply between 0-4 kW (0 to 4000 Watts) for example, depending on the use case. The eEGH produces thermal power to warm the catalyst but consumes electrical current to produce the thermal power. The eEGH demand is supported by a hybrid powertrain electrical system in an HEV or partially-HEV platform. As the amount of power demand from the eEGH will vary, in some examples, the information regarding power demand from the eEGH can be used to optimize the control strategy of a smart fuse system. For example, in a cold start use case, the eEGH may demand its full rated power (e.g., ~4 kW) to maintain after-treatment temperature, any other devices on the same power net, i.e., the may have their split-charging demand modified or their smart fuse configuration changed accordingly to allow for a higher or lower current draw.

In the example shown in FIG. 8, the control circuitry 830 is electrically connected to a low voltage (e.g., 12V) battery and bus 840, which is configured to supply electrical power to one or more low voltage accessories of the HEV, illustrated by load 870. The control circuitry 830 is, for example, an engine control module (ECM), in operational communication with each of the BISG 812, the engine 802, one or more DC-DC converters (if required), the aftertreatment system 820, a plurality of eEGHs 824, the low voltage battery and bus 840, the high voltage battery and bus 850 (e.g., an HEV power system), and a plurality of other vehicle loads 870. The load 870 may be a compressor used to pump fluids such as water through the high voltage battery and bus 850, the one or more DC-DC converters, and the BISG 812. In some examples, the power control system 800 further comprises an air pump (not shown) used to transfer the thermal energy from the eEGH 824 to the after-treatment system, during, for example, low flow conditions. In such a case, the air pump would be fluidly connected to the engine exhaust system to draw air from the atmosphere through the eEGH 824 to transfer thermal energy from the heating elements in the eEGH 824 to the catalyst.

The present disclosure is not limited to the set-up shown in FIG. 8. For example, the control circuitry 830 may be a stand-alone control circuitry or any other appropriate control circuitry of the hybrid vehicle. For example, the control circuitry may, at least in part, be integrated with another control circuitry of the vehicle. Furthermore, the control circuitry 860 may be configured to operationally communicate with any one or more of the vehicle components shown in FIG. 8, and/or any other appropriate components of the vehicle. For example, control circuitry 860 may be a stand-alone control circuitry configured to operationally communicate with at least one high voltage accessory, an electric motor-generator, and an eEGH, to control the electrical power output of the high voltage battery 850. Typically, the BISG 812, when in generator mode and actively engaged in regenerative braking can be used to power load 870 directly, or store generated energy, via the control circuitry 830, to the low voltage battery and bus 840 and/or high voltage battery and bus 850. A plurality of switches 832, e.g., smart fuses, can be used to electrically isolate components during the switching of the BISG 812 from motor to generator and the like.

While the example shown in FIG. 8 exemplifies the use of the control system 800 for an HEV, it is understood that the control system 800 may be implemented on an appropriate type of hybrid vehicle, such as a plug-in hybrid electric vehicle (PHEV), having one or more high voltage circuit components.

The control circuitry 830 can interrogate devices that are connected to the low voltage battery and bus 840 and the high voltage battery and bus 850 using, for example, CAN and/or LIN protocols. The central control circuitry could then use this information to monitor the performance of the device and make decisions about how to control it, and add torque demand to the engine 802 via BISG 812 to generate the electrical power. The added torque demand can be used to provide the power requirements determined by the system after the interrogation of the smart fuse.

By way of further example, the control circuitry 830 can interrogate the BISG 812, components of the aftertreatment system 822, such as eEGH 824, and other loads 870, such as compressor pumps for fluids and the like, to determine a total electrical demand already in the vehicle 800. This information, in addition to the peripheral devices connected to the low voltage battery and bus 840 and the high voltage battery and bus 850 by the user, can be used to determine, for example, split charge priorities, and power distribution in the power net of the vehicle 800. By interrogating devices in this way, it is possible to obtain a comprehensive view of the operating properties of a vehicle and its systems, which can help to optimize performance and diagnose issues.

Figure 9:
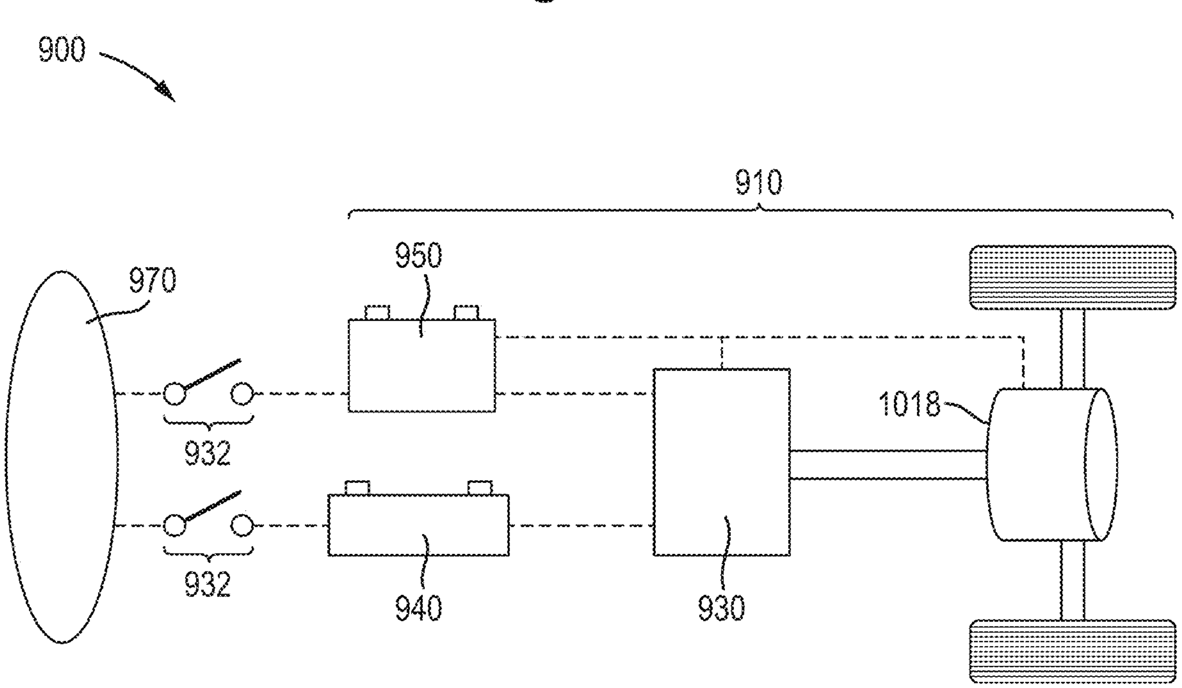
FIG. 9 is a block diagram of a control system for an electric vehicle, in accordance with some examples of the present disclosure.

FIG. 9 is a block diagram of a control system for an electric vehicle (EV), in accordance with some embodiments of the present disclosure. In the example shown in FIG. 9, the power control system 900 is for an exemplary EV system architecture, in accordance with at least one of the examples described herein. Each of the systems shown in FIG. 9 are communicatively and/or electrically coupled via control circuitry 930 (illustrated by the dashed line connectors). Shown in FIG. 9 is an e-machine 918, which is a device that may apply positive torque directly to the wheels of the EV, or, in some examples, apply negative torque to generate electrical energy. The e-machine 918 may be referred to as a motor generator. In some examples, the e-machine transmits torque to the wheels via a crankshaft or transmission when it's operating as a motor, and the crankshaft transmits torque back to the e-machine 918 when it operates as a generator, converting kinetic energy from the moving vehicle back into electricity.

In the example shown in FIG. 9, the control circuitry 930 is electrically connected to a low voltage (e.g., 12V) battery and bus 940, which is configured to supply electrical power to one or more low voltage accessories of the EV, illustrated by load 970. The control circuitry 930 is, for example, an engine control module (ECM), in operational communication with each of the e-machine 918, one or more DC-DC converters (if required, not shown), the low voltage battery and bus 940, the high voltage battery and bus 950 (e.g., an EV power system used to power the e-machine 918), and a plurality of other vehicle loads 970. The loads 970 may be a compressor used to pump fluids such as water through the high voltage battery and bus 950, the one or more DC-DC converters, and the e-machine 918.

The control circuitry 930 can interrogate devices that are connected to the low voltage battery and bus 940 and the high voltage battery and bus 940 using, for example, CAN and/or LIN protocols. Both protocols allow for the communication of data between devices, and the information can be used to determine the operating properties of the devices. For example, a device could report its current status, such as its temperature or voltage, to a central control circuitry over a CAN or LIN network. The central control circuitry could then use this information to monitor the performance of the device and make decisions about how to control it. By interrogating devices in this way, it is possible to obtain a comprehensive view of the operating properties of a vehicle and its systems, which can help to optimize performance and diagnose issues. This is a valuable tool for vehicle designers, manufacturers, and maintenance engineers, who can use the data to enhance the functionality and reliability of the vehicle.

The present disclosure is not limited to the set-up shown in FIG. 9. For example, the control circuitry 930 may be a stand-alone control circuitry or any other appropriate control circuitry of the hybrid vehicle. For example, the control circuitry may, at least in part, be integrated with another control circuitry of the vehicle. Furthermore, the control circuitry 930 may be configured to operationally communicate with any one or more of the vehicle components shown in FIG. 9, and/or any other appropriate components of the vehicle. For example, control circuitry 930 may be a stand-alone control circuitry configured to control the electrical power output of the high voltage battery 950. A plurality of switches 932, e.g., configurable smart fuses, can be used to electrically isolate components during the switching of the e-machines 918 from motor to generator and the like.

While the example shown in FIG. 9 exemplifies the use of the control system 900 for an EV, it is understood that the control system 900 may be implemented on any appropriate type of electric vehicle, having one or more high-voltage circuit components.

Figure 10:
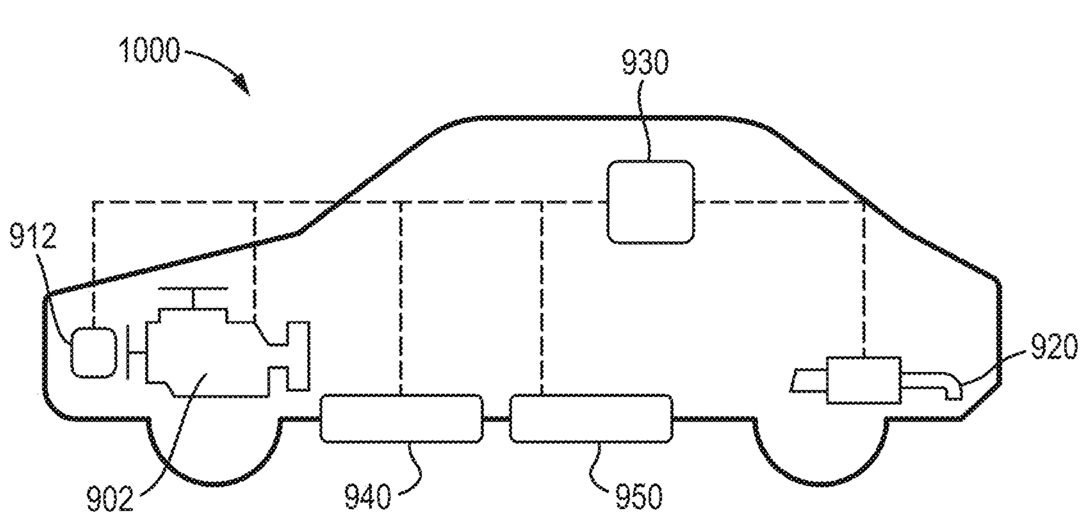
FIG. 10 illustrates a vehicle, in accordance with some examples of the present disclosure.

FIG. 10 illustrates a vehicle comprising an engine and an exemplary control system, in accordance with at least one of the examples described herein. FIG. 10 illustrates a vehicle 1000 comprising an exemplary exhaust system 920, a control module 930, a low voltage battery and bus 940, and a high voltage battery and bus 950, in accordance with at least one of the examples described herein. According to some examples, there is provided a vehicle 1000 comprising the control system 800, 900 of FIGS. 8 and 9, as described above. In some examples, the vehicle further comprises a drive train comprising an e-machine 912, an engine 902, clutch and transmission (not shown).

The methods described above may be implemented on vehicle 1000. Each of the systems in the vehicle is communicatively coupled via control circuitry 930 (illustrated by the dashed line connectors). However, the present disclosure is not limited to the set-up shown in FIG. 10. For example, the control circuitry 930 may be any appropriate type of control circuitry, such as a stand-alone control circuitry, or any other appropriate control circuitry of the hybrid vehicle. For example, control circuitry 930 may, at least in part, be integrated with another control circuitry of the vehicle. Furthermore, the control circuitry 930 may be configured to operationally communicate with any one or more of the vehicle components shown in FIGS. 8-9, and/or any other appropriate components of the vehicle. For example, control circuitry 930 may be a stand-alone control circuitry at least partially configured to operationally communicate with at least one low-voltage accessory, an electric generator, and an e-machine, to control torque demand on engine 902. Furthermore, it is understood that control circuitry 930 may be configured to carry out one or more of the above-disclosed electrical power control methods for regenerative braking for an HEV or EV alike.

The system combining smart fuses, interrogation technology over CAN and LIN protocols, and determining split charge priority is advantageous for a wide range of vehicles, including:

Recreational vehicles: RVs often have multiple batteries for different uses, such as starting, lighting, and power for appliances, and the split charge priority system can help ensure that the batteries are charged efficiently and optimally;

Electric vehicles and hybrid vehicles: in EVs and HEVs, it is important to ensure that the batteries are charged efficiently and optimally to maximize range and battery life. The split charge priority system can help ensure that the batteries are charged in the most effective way;

Marine vehicles: marine vehicles, such as boats and yachts, often have multiple batteries for different uses, and the split charge priority system can help ensure that the batteries are charged efficiently and optimally, reducing throughput to the batteries and improving overall performance; and/or Off-grid vehicles: off-grid vehicles, such as off-road vehicles and camping vehicles, often rely on batteries for power, and the split charge priority system can help ensure that the batteries are charged efficiently and optimally, reducing throughput to the batteries and improving overall performance.

In summary, in some examples, the split charge priority system is advantageous for a wide range of vehicles that have multiple batteries and require efficient and optimal charging. However, it is also considered within the scope to retrofit a device into a system to provide the methods and systems herein. For example, retrofitting a device into a system using smart fuses, interrogation technology over CAN and LIN protocols, and determining split charge priorities can typically be achieved through the following steps:

- Installation of smart fuses and communication hardware: the smart fuses and communication hardware, such as CAN or LIN transceivers, can be installed in the vehicle's electrical system. The smart fuses are connected to the existing electrical circuits, while the communication hardware is connected to the control system;
- Configuration of communication protocols: the communication protocols, such as CAN or LIN, are configured to allow the control system to communicate with the smart fuses and other devices in the system. This includes setting up the communication settings, such as baud rate, addressing, and message format;
- Integration of the control system: the control system, which is responsible for managing the split charge priority via, for example, control circuitry, is typically integrated into the vehicle's electrical system. This typically involves connecting the control system to the communication hardware and configuring the software settings to allow for communication with the smart fuses and other devices in the system;
- Calibration of the system: the system is then calibrated to ensure that the smart fuses and control system are working correctly and that the split charge priority is being determined accurately. This typically involves testing the communication between the devices, monitoring the flow of current, and making any necessary adjustments to the software or hardware settings; and
- Final testing and verification: the final step involves testing the system to ensure that it is functioning correctly and that the split charge priority is being determined accurately. This includes verifying that the smart fuses are controlling the flow of current correctly and that the control system is accurately determining the split charge priority.

Figure 11:
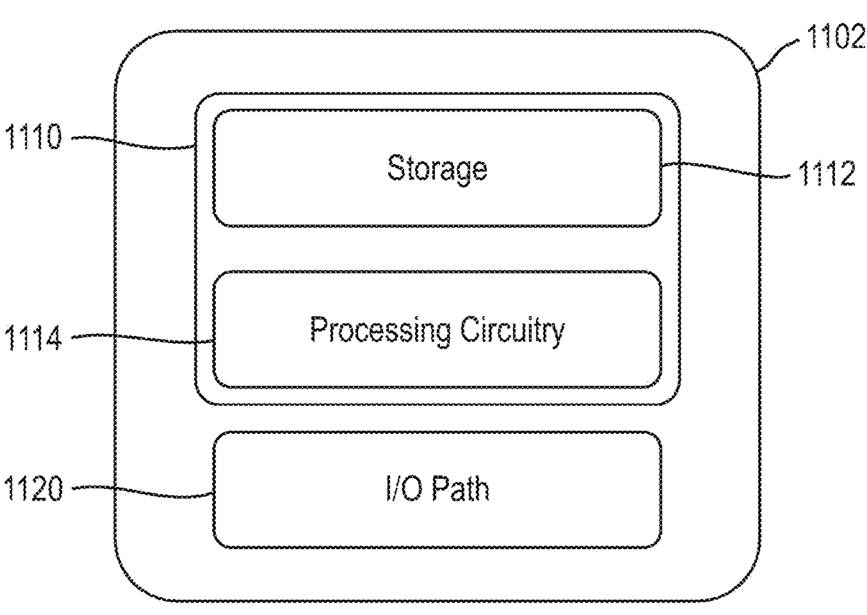
FIG. 11 illustrates a block diagram of a computing module, in accordance with some examples of the disclosure.

FIG. 11 illustrates a block diagram of a computing module, e.g., control circuitry, in accordance with some examples of the disclosure. In some examples, computing module 1102 may be communicatively connected to a user interface (not shown). In some examples, computing module 1102, may be the control circuitry 930 and/or control circuitry 1030 of systems 900, 1000 or of vehicle 1100 as described with reference to FIGS. 9-11 above. In some examples, computing module 1102 may include processing circuitry, control circuitry, and storage (e.g., RAM (Random Access Memory), ROM (Read Only Memory), hard disk, removable disk, etc.). Computing module 1102 may include an input/output path 1120. I/O path 1120 may provide device information, or other data, over a local area network (LAN) or wide area network (WAN), and/or other content and data to control circuitry 1110, which includes processing circuitry 1114 and storage 1112. Control circuitry 1110 may be used to send and receive commands, requests, signals (digital and analogue), and other suitable data using I/O path 1120, which may comprise I/O circuitry. I/O path 1120 may connect control circuitry 1110 (and specifically processing circuitry 1014) to one or more communications paths. In some examples, computing module 1102 may be an onboard computer of a vehicle, such as a vehicle 1100.

Control circuitry 1110 may be based on any suitable processing circuitry such as processing circuitry 1114. As referred to herein, processing circuitry should be understood to mean circuitry based on one or more microprocessors, microcontrol circuitrys, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some examples, processing circuitry may be distributed across multiple separate processors or processing units, for example, multiple of the same type of processing units (e.g. two Intel Core i7 processors) or multiple different processors (e.g., an Intel Core i5 processor and an Intel Core i7 processor). In some examples, control circuitry 1114 executes instructions for computing module 1002 stored in memory (e.g., storage 1112).

The memory may be an electronic storage device provided as storage 1112, which is part of control circuitry 1110. As referred to herein, the phrase "electronic storage device" or "storage device" should be understood to mean any device (physical or cloud-based) for storing electronic data, computer software, or firmware, such as random-access memory, read-only memory, hard drives, solid-state devices, quantum storage devices, or any other suitable fixed or removable storage devices, and/or any combination of the same. The non-volatile memory may also be used (e.g., to launch a boot-up routine and other instructions). Storage 1112 may be subdivided into different spaces such as kernel space and user space. Kernel space is a portion of memory or storage that is, e.g., reserved for running a privileged operating system kernel, kernel extensions, and most device drivers. User space may be considered an area of memory or storage where application software generally executes and is kept separate from kernel space so as to not interfere with system-vital processes. Kernel mode may be considered as a mode when control circuitry 1010 has permission to operate on data in kernel space, while applications running in user mode must request control circuitry 1110 to perform tasks in kernel mode on its behalf.

Computing module 1102 may be coupled to a communications network, e.g., for retrieving data from storage 1112. The communication network may be one or more networks including the Internet, a mobile phone network, a mobile voice or data network (e.g., a 3G, 4G, 5G or LTE network), a mesh network, peer-to-peer network, cable network, cable reception (e.g., coaxial), microwave link, DSL (Digital Subscriber Line) reception, cable internet reception, fibre reception, over-the-air infrastructure or other types of communications network or combinations of communications networks. Computing module 1102 may be coupled to a second communication network (e.g., Bluetooth, Near Field Communication, service provider proprietary networks, or wired connection) to retrieve information such as regenerative braking profiles. Paths may separately or together include one or more communications paths, such as a satellite path, a fiber-optic path, a cable path, a path that supports Internet communications, free-space connections (e.g., for broadcast or other wireless signals), or any other suitable wired or wireless communications path or combination of such paths.

In some examples, the control circuitry 1110 is configured to carry out any of the methods as described herein. For example, storage 1112 may be a non-transitory computer-readable medium having instructions encoded thereon, to be carried out by processing circuitry 1114, which cause control circuitry 1110 to carry out a method of controlling a regenerative braking system comprising a battery.

It should be understood that the examples described above are not mutually exclusive with any of the other examples described with reference to FIGS. 1-11. The order of the description of any examples is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

Other variations to the disclosed examples can be understood and effected by those skilled in the art in practising the claimed invention, from a study of the drawings, the disclosure, and the appended claims. In the claims, the word “comprising” does not exclude other elements or steps, and the indefinite article “a” or “an” does not exclude a plurality. The mere fact that certain measures are recited in mutually different dependent claims does not indicate that a combination of these measures cannot be used to advantage. Any reference signs in the claims should not be construed as limiting the scope.

The disclosure of this invention is made to illustrate the general principles of the systems and processes discussed above and is intended to be illustrative rather than limiting. More generally, the above disclosure is meant to be exemplary and not limiting and the scope of the invention is best determined by reference to the appended claims. In other words, only the claims that follow are meant to set bounds as to what the present disclosure includes.

While the present disclosure is described with reference to particular example applications, it shall be appreciated that the invention is not limited thereto. It will be apparent to those skilled in the art that various modifications and developments may be made without departing from the scope and spirit of the present invention. Those skilled in the art would appreciate that the actions of the processes discussed herein may be omitted, modified, combined, and/or rearranged, and any additional actions may be performed without departing from the scope of the invention.

Any system feature as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some, and/or all features in one aspect can be applied to any, some, and/or all features in any other aspect, in any appropriate combination. It should also be appreciated that particular combinations of the various features described and defined in any aspect can be implemented and/or supplied and/or used independently.

The following items pertain to further examples of the present disclosure:

Example 1 is method for configuring electronic fuses based on peripheral devices connected to a vehicle system, the method comprising: detecting a first peripheral device has been connected to the vehicle system; receiving a plurality of signals from the first peripheral device connected to the vehicle system; and configuring a first electronic fuse based on the plurality of signals from the first peripheral device, wherein the first electronic fuse is configured to electrically isolate the first peripheral device from the vehicle system upon receiving a current overload.

Example 2 comprises Example 1, further comprising: detecting a first current overload; isolating the first peripheral device from the vehicle system; and resetting the first electronic fuse after a first time period.

Example 3 comprises Examples 1-2, wherein the first time period is user-configurable.

Example 4 comprises Examples 1-3, further comprising: after detecting the first peripheral device has been connected to the vehicle system, interrogating the first peripheral device.

Example 5 comprises Example 4, further comprising: determining the first electronic fuse configuration based on the interogation of the first peripheral device.

Example 6 comprises Examples 4-5, further comprising: determining a split charge priority of batteries connected to the vehicle system based on the interogation of the first peripheral device.

Example 7 comprises Example 6, further comprising: detecting a second peripheral device has been connected to the vehicle system; receiving a plurality of signals from the second peripheral device connected to the vehicle system; and updating the split-charge priorities of the batteries of the vehicle system based on the plurality of signals from the first and second peripheral devices.

Example 8 comprises Examples 6-7, further comprising updating split charge priority of the batteries via an over-the-air update.

Example 9 comprises Examples 4-8, wherein the first peripheral device is intterogated over a control circuitry area network, CAN, and/or a local interconnect network, LIN, communication protocol.

Example 10 comprises Examples 1-9, further comprising updating the configuration of the first electronic fuse via an over-the-air update.

Example 11 comprises an electronic system for a vehicle, the system comprising control circuitry configured to: detect a first peripheral device has been connected to the vehicle system; and input/output circuitry configured to: receive a plurality of signals from the first peripheral device connected to the vehicle system, and wherein the control circuitry is further configured to configure a first electronic fuse based on the plurality of signals from the first peripheral device, wherein the first electronic fuse is configured to electrically isolate the first peripheral device from the vehicle system upon receiving a current overload.

Example 12 comprises Example 11, the control circuitry further configured to: detect a first current overload; isolate the first peripheral device from the vehicle system; and reset the first electronic fuse after a first time period.

Example 13 comprises Examples 11-12, wherein the first time period is user-configurable.

Example 14 comprises Examples 11-13, the control circuitry further configured to, after detecting the first peripheral device has been connected to the vehicle system, interrogate the first peripheral device.

Example 15 comprises Examples 14, the control circuitry further configured to determine the first electronic fuse configuration based on the interogation of the first peripheral device.

Example 16 comprises Example 14-15, the control circuitry further configured to determine a split charge priority of batteries connected to the vehicle system based on the interogation of the first peripheral device.

Example 17 comprises Examples 14-16, the control circuitry further configured to: detect a second peripheral device has been connected to the vehicle system; receive a plurality of signals from the second peripheral device connected to the vehicle system; and update the split-charge priorities of the batteries of the vehicle system based on the plurality of signals from the first and second peripheral devices.

Example 18 comprises Example 16-17, further comprising updating split charge priority of the batteries via an over-the-air update.

Example 19 comprises Examples 14-18, wherein the first peripheral device is intterogated over a control circuitry area network, CAN, and/or a local interconnect network, LIN, communication protocol.

Example 20 comprises Examples 11-19, further comprising updating the configuration of the first electronic fuse via an over-the-air update.

Example 21 comprises a vehicle comprising an electronic system for a vehicle, the system comprising a control circuitry, the control circuitry configured to: detect a first peripheral device has been connected to the vehicle system; receive a plurality of signals from the first peripheral device connected to the vehicle system; and configure a first electronic fuse based on the plurality of signals from the first peripheral device, wherein the first electronic fuse is configured to electrically isolate the first peripheral device from the vehicle system upon receiving a current overload.

Example 22 comprises Example 21, the control circuitry further configured to: detect a first current overload; isolate the first peripheral device from the vehicle system; and reset the first electronic fuse after a first time period.

Example 23 comprises Examples 21-22, wherein the first time period is user-configurable.

Example 24 comprises Examples 21-23, the control circuitry further configured to: after detecting the first peripheral device has been connected to the vehicle system, interrogate the first peripheral device.

Example 25 comprises Example 24, the control circuitry further configured to: determine the first electronic fuse configuration based on the interogation of the first peripheral device.

Example 26 comprises Examples 24-25, the control circuitry further configured to: determine a split charge priority of batteries connected to the vehicle system based on the interogation of the first peripheral device.

Example 27 comprises Example 26, the control circuitry further configured to: detect a second peripheral device has been connected to the vehicle system; receive a plurality of signals from the second peripheral device connected to the vehicle system; and update the split-charge priorities of the batteries of the vehicle system based on the plurality of signals from the first and second peripheral devices.

Example 28 comprises Examples 26-28, the control circuitry futher configured to update split charge priority of the batteries via an over-the-air update.

Example 29 comprises Examples 24-28, wherein the first peripheral device is intterogated over a control circuitry area network, CAN, and/or a local interconnect network, LIN, communication protocol.

Example 30 comprises Examples 21-29, the control circuitry further configured to update the configuration of the first electronic fuse via an over-the-air update.

Example 31 is a non-transitory computer-readable medium, having instructions recorded thereon for for configuring electronic fuses based on peripheral devices connected to a vehicle system, the instructions, when executed, cause a control circuitry to carry out a method, the method comprising: detecting a first peripheral device has been connected to the vehicle system; receiving a plurality of signals from the first peripheral device connected to the vehicle system; and configuring a first electronic fuse based on the plurality of signals from the first peripheral device, wherein the first electronic fuse is configured to electrically isolate the first peripheral device from the vehicle system upon receiving a current overload.

Example 32 comprises Example 31, further comprising: detecting a first current overload; isolating the first peripheral device from the vehicle system; and resetting the first electronic fuse after a first time period.

Example 33 comprises Examples 31-32, wherein the first time period is user-configurable.

Example 34 comprises Examples 31-33, further comprising: after detecting the first peripheral device has been connected to the vehicle system, interrogating the first peripheral device.

Example 35 comprises Example 34, further comprising: determining the first electronic fuse configuration based on the interogation of the first peripheral device.

Example 36 comprises Examples 34-35, further comprising: determining a split charge priority of batteries connected to the vehicle system based on the interogation of the first peripheral device.

Example 37 comprises Example 36, further comprising: detecting a second peripheral device has been connected to the vehicle system; receiving a plurality of signals from the second peripheral device connected to the vehicle system; and updating the split-charge priorities of the batteries of the vehicle system based on the plurality of signals from the first and second peripheral devices.

Example 38 comprises Examples 36-37, further comprising updating split charge priority of the batteries via an over-the-air update.

Example 39 comprises Examples 34-38, wherein the first peripheral device is intterogated over a control circuitry area network, CAN, and/or a local interconnect network, LIN, communication protocol.

Example 40 comprises Examples 31-39, further comprising updating the configuration of the first electronic fuse via an over-the-air update.

What is claimed is:

1. A method for configuring electronic fuses based on peripheral devices connected to a vehicle system, the method comprising:

detecting a first peripheral device has been connected to the vehicle system;

receiving a plurality of signals from the first peripheral device connected to the vehicle system;

configuring a first electronic fuse, based on the plurality of signals from the first peripheral device, to electrically isolate the first peripheral device from the vehicle system upon receiving a current overload;

detecting a first current overload;

isolating the first peripheral device from the vehicle system; and resetting the first electronic fuse after a first time period.

2. The method of claim 1, wherein the first time period is user-configurable.

3. A method for configuring electronic fuses based on peripheral devices connected to a vehicle system, the method comprising:

detecting a first peripheral device has been connected to the vehicle system;

after detecting the first peripheral device has been connected to the vehicle system, interrogating the first peripheral device;

receiving a plurality of signals from the first peripheral device connected to the vehicle system; and configuring a first electronic fuse, based on the plurality of signals from the first peripheral device, to electrically isolate the first peripheral device from the vehicle system upon receiving a current overload.

4. The method of claim 3, further comprising:

determining the first electronic fuse configuration based on the interrogation of the first peripheral device.

5. The method of claim 3, further comprising:

determining a change in split charge priority of at least two batteries connected to the vehicle system based on the interrogation of the first peripheral device; and updating the split charge priority of the at least two batteries connected to the vehicle system.

6. The method of claim 5, further comprising:

determining a second peripheral device has been connected to the vehicle system;

receiving a plurality of signals from the second peripheral device connected to the vehicle system; and updating the split-charge priorities of the batteries of the vehicle system based on the plurality of signals from the first and second peripheral devices.

7. The method of claim 5, further comprising:

receiving updated split charge priority data; and updating split charge priority of the at least two batteries based on the updated split charge priority data.

8. The method of claim 3, wherein the first peripheral device is interrogated over a control circuitry area network, CAN, communication protocol.

9. The method of claim 3, wherein the first peripheral device is interrogated over a local interconnect network, LIN, communication protocol.

10. A method for configuring electronic fuses based on peripheral devices connected to a vehicle system, the method comprising:

detecting a first peripheral device has been connected to the vehicle system;

receiving a plurality of signals from the first peripheral device connected to the vehicle system;

configuring a first electronic fuse, based on the plurality of signals from the first peripheral device, to electrically isolate the first peripheral device from the vehicle system upon receiving a current overload;

receiving updated electronic fuse configuration data; and reconfiguring the first electronic fuse based on the updated configuration data.

11. A method for configuring electronic fuses based on peripheral devices connected to a vehicle system, the method comprising:

detecting a first peripheral device has been connected to the vehicle system;

receiving a plurality of signals from the first peripheral device connected to the vehicle system;

configuring a first electronic fuse, based on the plurality of signals from the first peripheral device, to electrically isolate the first peripheral device from the vehicle system upon receiving a current overload; and updating the configuration of the first electronic fuse via an over-the-air update.

12. An electronic system for a vehicle, the system comprising:

control circuitry configured to:

detect a first peripheral device has been connected to the vehicle system; and input/output circuitry configured to:

receive a plurality of signals from the first peripheral device connected to the system, and wherein the control circuitry is further configured to:

configure a first electronic fuse, based on the plurality of signals from the first peripheral device, to electrically isolate the first peripheral device from the vehicle system upon receiving a current overload; and wherein the control circuitry is further configured to:

detect a first current overload;

isolate the first peripheral device from the vehicle system; and reset the first electronic fuse after a first time period.

13. The electronic system of claim 12, wherein the first time period is user-configurable.

14. The electronic system of claim 12, the control circuitry further configured to:

after detecting the first peripheral device has been connected to the vehicle system, interrogate the first peripheral device.

15. The electronic system of claim 14, the control circuitry further configured to:

determine the first electronic fuse configuration based on the interrogation of the first peripheral device.

16. The electronic system of claim 14, the control circuitry further configured to:

determine a change in split charge priority of at least two batteries connected to the vehicle system based on the interrogation of the first peripheral device; and update the split charge priority of the at least two batteries connected to the vehicle system.

17. A vehicle comprising the electronic system of claim 12.

* * * * *